Figure 1:
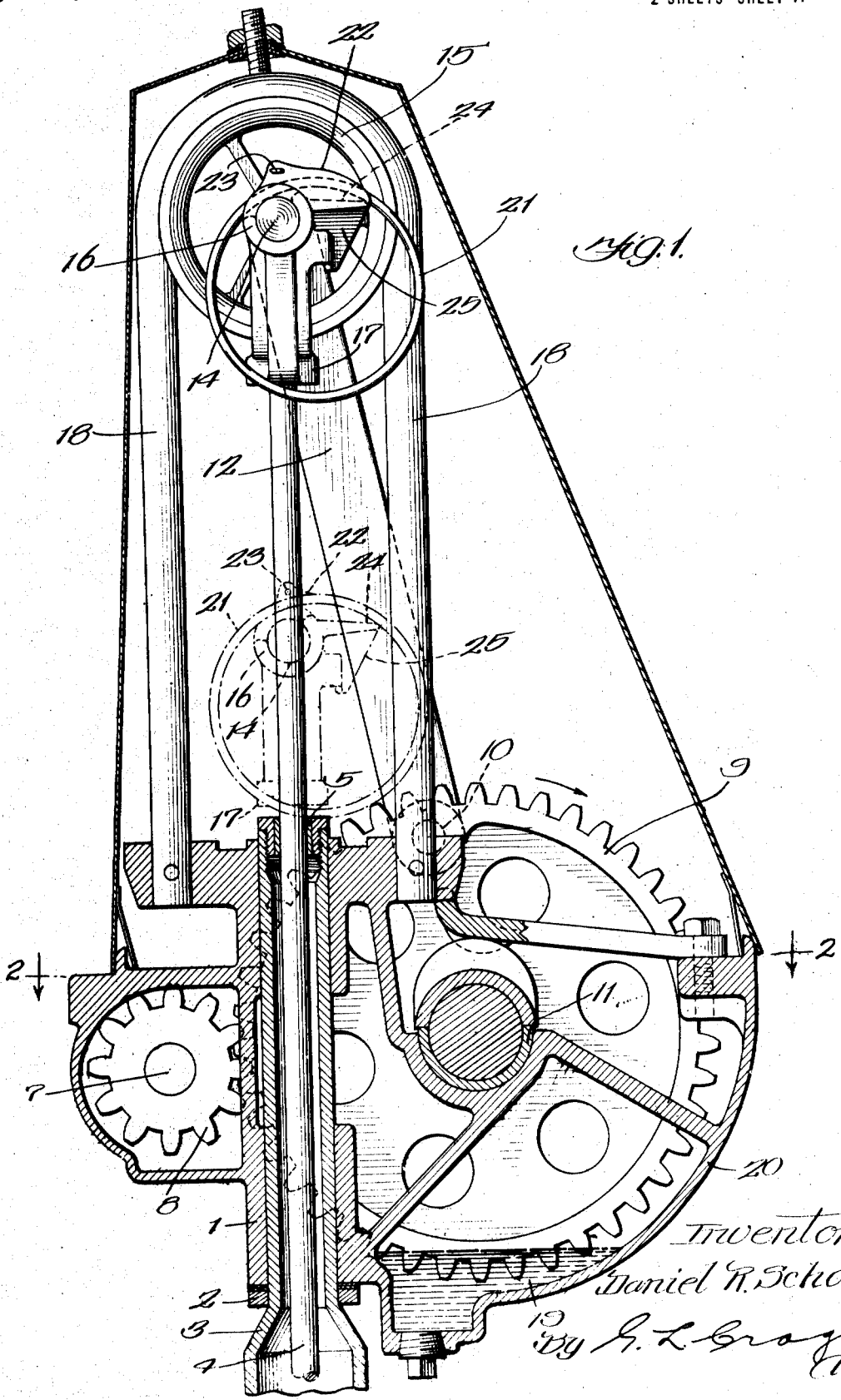

D. R. SCHOLES.
LUBRICATING MECHANISM.
APPLICATION FILED DEC. 8, 1919.
1,341,080.
Patented May 25, 1920.
2 SHEETS—SHEET 2.
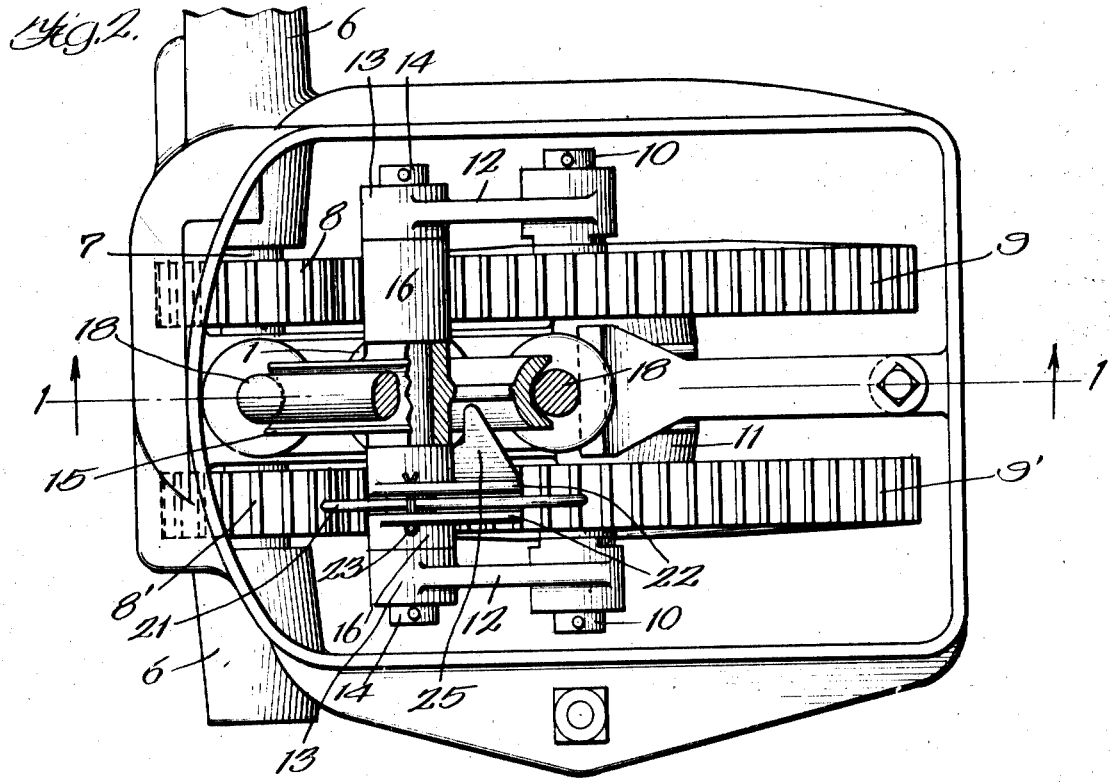
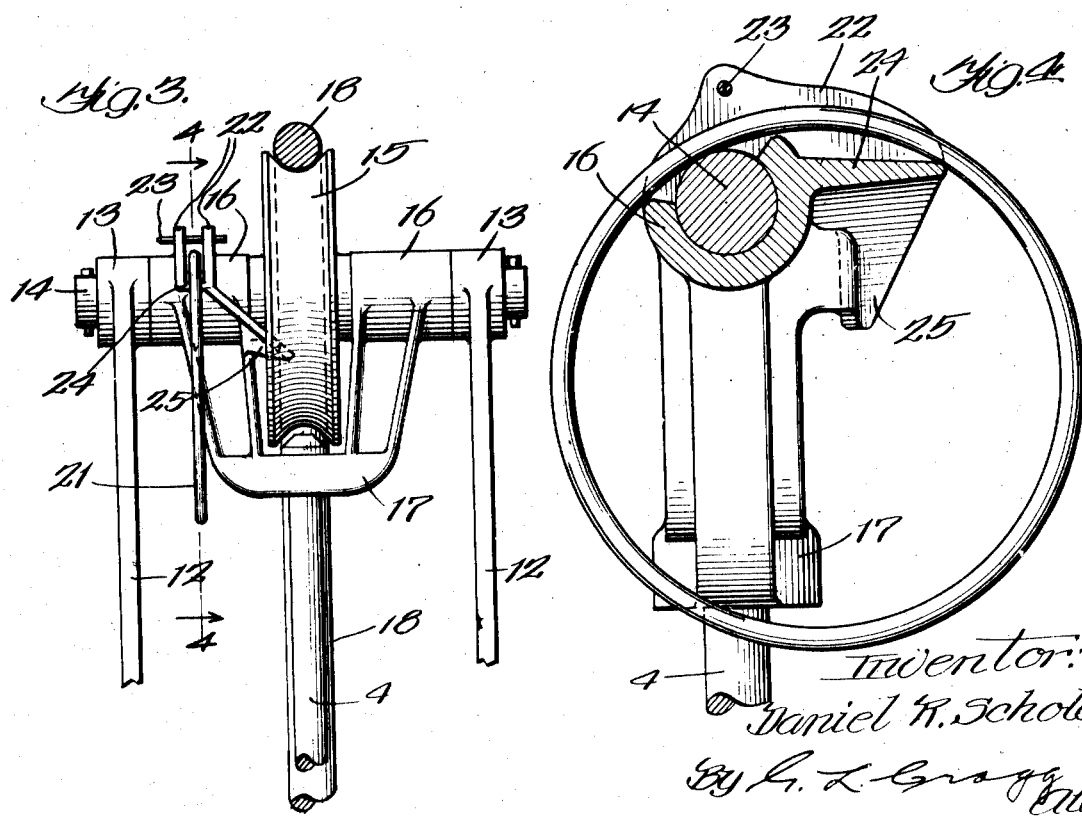
Inventor:
Daniel R. Scholes
By G. L. Gragg Atty.

UNITED STATES PATENT OFFICE.

DANIEL R. SCHOLES, OF CHICAGO, ILLINOIS, ASSIGNOR TO AERMOTOR COMPANY, OF CHICAGO, ILLINOIS, A CORPORATION OF ILLINOIS.

LUBRICATING MECHANISM.

1,341,080.   Specification of Letters Patent.   Patented May 25, 1920.

Application filed December 8, 1919. Serial No. 343,286.

*To all whom it may concern:*

Be it known that I, DANIEL R. SCHOLES, a citizen of the United States, residing at Chicago, in the county of Cook and State of Illinois, have invented a certain new and useful Improvement in Lubricating Mechanism, of which the following is a full, clear, concise, and exact description.

My invention relates to lubricating mechanism and has for its general object the provision of improved means for transferring lubricant from a lubricant source to parts which are to be lubricated. My invention is of particular utility when employed for lubricating parts which are reciprocable with respect to the source of lubricant, as for example working surfaces at the ends of pitmen which are remote from the pitmen operating wheels that dip into lubricating oil, though my invention is not to be thus limited, the invention being defined in the claims.

My invention has been usefully embodied in a wind mill structure for effecting the transfer of lubricant from an oil basin within the wind mill head to parts at the upper ends of the pitmen that are operatively connected with the pump rod or other load shaft.

In carrying out my invention a conveyer is employed that travels bodily with the reciprocating parts and which reaches and leaves the source of lubricant or the wheel that carries the lubricant from such source and is therefore itself a lubricant source with respect to such conveyer. This conveyer is preferably in the form of a ring, desirably endless, which surrounds some of the parts with which it reciprocates and is of sufficiently large diameter so that it may be bodily moved with respect to the parts with which it reciprocates when contacting with the oil carrying portion from which it is to receive oil. If this contacting portion happens to be a rotating element such as one of the pitmen driven gear wheels, the relation of such rotating element to the ring is preferably such that turning torque will be imparted to the ring in the rotation of the rotating element and other turning effort will also be imparted to the ring due to the action of gravity, the latter result being secured by having the rotating element engage the ring upon one side of the vertical line that contains the center of gravity of the ring.

I will explain my invention fully by reference to the accompanying drawings showing the preferred embodiment thereof and in which Figure 1 is a sectional view on line 1—1 of Fig. 2; Fig. 2 is a sectional view on line 2—2 of Fig. 1; Fig. 3 is a view, partly in section, taken at right angles to the direction in which Fig. 1 is taken, parts being removed to reveal details of construction; and Fig. 4 is a sectional view on line 4—4 of Fig. 3.

Like parts are indicated by similar characters of reference throughout the different figures.

The revolving head 1 of the wind mill is mounted to turn upon a collar 2 mounted upon and surrounding a suitably supported stationary upright tubular wind wheel mounting 3 through which is passed the upright reciprocating pump rod or load shaft 4 that is guided in its reciprocations by guiding boxes of which one 5 is shown upon the windwheel mounting. The upper part of the mounting 3 passes through a vertical bore in the mill head, the engaging surfaces of this bore and the mounting passing therethrough being cylindrical to be in turning fit.

The mill head is formed with horizontal bearings 6 for the horizontal wind wheel shaft 7 which carries the wheel (not shown) of the mill. Two upright co-axial spur pinions 8, 8' of the same diameter are fixedly secured upon the shaft 7 and mesh with the co-axial upright spur gears 9, 9' of the same diameter fixed upon a common horizontal shaft 10 supported in bearings 11 that are carried upon the mill head.

Pitmen 12 are connected at their lower ends with the spur gears 9, 9' to be driven thereby, these pitmen terminating at their upper ends in bearings 13 through which a shaft 14 passes. An idler sheave 15 is provided upon the middle of the shaft 14 and is maintained spaced apart from the bearings 13 by the non-rotating spacing sleeves 16 through which the shaft 14 passes. The sleeves 16 are united by a yoke 17 for maintaining them in rigid relation and to which the upper end of the pump rod or load shaft is secured in order that it may be reciprocated by the pitmen.

The sheave has a transversely curved annular groove in its periphery that receives the vertical sides of the guiding stirrup 18, whereby the upper ends of the pitmen are constrained to move in a vertical rectilineal path to impart similar movement to the pump rod or load shaft 4.

The purpose specifically served by my invention in connection with the illustrated wind mill (but to which purpose the invention is not to be limited) is the application of lubricating oil to the shaft 14 and parts turning upon and with respect thereto and also the application of lubricating oil to the periphery of the sheave 15 and the parts of the upright guides 18 engaged thereby. As this result is to be accomplished whether the shaft 14 oscillates or is stationary and as the shaft 14 would not be an effective agency in accomplishing this purpose even though it oscillates, I provide means other than this shaft for initiating the transfer of lubricant thereto and parts associated therewith. This initiating means conveniently resides in the rotating spur gear or element 9', before mentioned and itself serving as a lubricant source, which together with gear 9 dips within a body of oil 19 contained in the oil basin 20 formed in the mill head. The teeth of the gear wheels carry the oil upwardly oil being transferred from gear 9' to an oil conveyer 21 traveling bodily with the shaft 14 and in fluid conductive connection with this shaft and associated parts. This fluid conveyer 21 is preferably in the form of a ring, desirably endless, which surrounds the shaft 14 and one of the bearings 16 for this shaft, this ring being sufficiently large in diameter to reach and be actuated by the gear wheel 9' while said shaft is in the lower part of its travel. The ring is influenced to turn counter-clockwise intermittently by the tangential torque imparted thereto by the clockside rotating gear 9' when contacting therewith. It will be observed that the center of gravity of the ring, which happens also to be its geometrical center, is upon one side of the place of contact of the ring with the gear 9' when arresting the ring in its downward movement so that counter-clockwise turning effort is also then imparted to the ring by its own weight. It is preferable to employ both of these ways of turning the oil feeding ring but I do not wish to be limited to the employment of both means for turning the ring.

By the construction and arrangement described the ring is caused to creep and, in creeping, will carry the oil above and deposit it upon the shaft 14 along which the oil will work to lubricate parts turning upon the shaft.

In order that the oil may more readily be passed to the shaft the particular bearing 16 surrounded by the ring is cut away to expose an upper part of the shaft so that the ring may engage the shaft or drop oil directly thereupon. This particular bearing 16 is also preferably provided with parallel wings 22 between which the ring is disposed substantially to confine it to one plane. A cotter pin 23 is passed through these wings and above the shaft to prevent the ring from leaving the space between the wings. A shelf or ledge 24 is disposed between the wings. The vertical line containing the center of gravity of the ring is between and equidistant from the vertical lines that include the points of engagement of the ring with the shaft and the outer end of said shaft, whereby the ring and its center of gravity are so positioned that the ring may be turned by the action of the gear 9' and also by the action of gravity, in the manner hitherto set forth.

An oil leader 25 is formed in the same piece with shelf 24 from which this leader depends. Some of the oil transferred from the ring to the shelf will flow downwardly onto said leader which ends within the circle of the sheave 15. The oil will drop onto the inner surface of the rim of the sheave and will work its way to the annular groove in the sheave rim and thence to the upright guides 18 received in this annular groove.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. Lubricating mechanism including a reciprocating element; a rotatable lubricant conveyer loosely carried upon the reciprocating element; and means intermittently contacting with the lubricant conveyer for intermittently turning said lubricant conveyer.

2. Lubricating mechanism including a source of lubricant; a reciprocating element movable toward and from the source of lubricant; and a lubricant conveyer traveling with the reciprocating element and carried thereby into and out of contact with the source of lubricant, there being means intermittently contacting with the lubricant conveyer for causing the portion of the lubricant conveyer having lubricant supplied thereto to move toward the reciprocating element.

3. Lubricating mechanism including a source of lubricant; a reciprocating element movable toward and from the source of lubricant; a revoluble lubricant conveyer traveling with the reciprocating element and carried thereby into and out of contact with the source of lubricant; and means intermittently engaged by the lubricant conveyer for turning said lubricant conveyer intermittently to cause it to carry the lubricant received thereon from the source of lubricant toward the reciprocating element.

4. Lubricating mechanism including a source of lubricant; a reciprocating element movable toward and from the source of lubricant; a revoluble lubricant conveying ring surrounding the reciprocating element and brought thereby into and out of contact with the source of lubricant; and means for turning said lubricant conveying ring to cause it to carry the lubricant received thereon from the source of lubricant toward the reciprocating element.

5. Lubricating mechanism including a source of lubricant; a reciprocating element movable toward and from the source of lubricant; and a revoluble lubricant conveying ring surrounding the reciprocating element and brought thereby into and out of contact with the source of lubricant, there being a rotating element engaged by said ring when applied to the source of lubricant to rotate the ring.

6. Lubricating mechanism including a source of lubricant; a reciprocating element movable toward and from the source of lubricant; and a revoluble lubricant conveying ring loosely surrounding the reciprocating element and brought thereby into and out of contact with the source of lubricant, there being means for arresting the travel of the ring before the reciprocating element ceases its travel in the direction of the source of lubricant, said arresting means being engageable with the ring upon one side of the vertical line including the center of gravity of the ring to enable gravity to effect rotation of the ring.

7. Lubricating mechanism including a source of lubricant; a reciprocating element movable toward and from the source of lubricant; a revoluble lubricant conveying ring loosely surrounding the reciprocating element and brought thereby into and out of contact with the source of lubricant, there being means for arresting the travel of the ring before the reciprocating element ceases its travel in the direction of the source of lubricant, said arresting means being engageable with the ring upon one side of the vertical line including the center of gravity of the ring to enable gravity to effect rotation of the ring; and mechanism for rotating said means in a direction to cause it to exert turning effort upon the ring in the same direction in which the ring is caused to turn by gravity when its travel is arrested by said means.

8. Lubricating mechanism including a source of lubricant; a rotating element dipping within the lubricant; and a rotatable lubricant conveyer engaging and turned by the portion of the rotating element that dips within the lubricant to transfer lubricant to the lubricant conveyer.

9. Lubricating mechanism including a source of lubricant; a rotating element dipping within the lubricant; a rotatable lubricant conveyer engaging the portion of the rotating element that dips within the lubricant to transfer lubricant to and turn the lubricant conveyer; and a support loosely holding the lubricant conveyer, this support and the aforesaid rotating element being capable of relative movement bodily to an extent that will permit continuance of such relative movement while the conveyer and the aforesaid rotating element are in engagement, the place of this engagement being upon that side of the vertical line including the center of gravity of the conveyer which will enable gravity to coöperate with the rotating element in rotating the conveyer.

10. Lubricating mechanism including a rotating source of lubricant; a rotatable lubricant conveyer engaging a lubricant holding portion of the rotating source of lubricant to transfer lubricant to the lubricant conveyer and to turn such conveyer; and a support loosely holding the lubricant conveyer, this support and the aforesaid rotating source of lubricant being capable of relative movement bodily to an extent that will permit continuance of such relative movement while the conveyer and the aforesaid rotating source of lubricant are in engagement, the place of this engagement being upon that side of the vertical line including the center of gravity of the conveyer which will enable gravity to operate with the rotating source of lubricant in rotating the conveyer.

11. Lubricating mechanism including a rotating lubricant conveyer; a source of lubricant with which such conveyer contacts; and means for effecting bodily movement of the conveyer with respect to the source of lubricant, there being means for engaging said conveyer upon one side of the vertical line including the center of gravity of the conveyer to arrest the movement thereof to turn it.

12. Lubricating mechanism including a rotating lubricant conveyer; a rotating lubricant supply; and means for effecting bodily relative movement between said conveyer and rotating lubricant supply to bring said conveyer into and out of contact with the lubricant supply.

13. Lubricating mechanism including a rotating lubricant conveyer; a rotating lubricant supply; and means for effecting bodily relative movement between said conveyer and rotating lubricant supply to bring said conveyer into and out of contact with the lubricant supply that also engages the lubricant conveyer upon one side of the vertical line that includes the center of gravity of the lubricant conveyer to turn it.

14. Lubricating mechanism including a pitman; a wheel connected with one end of the pitman for operating it; a ring carried at the other end of the pitman and bodily moved thereby, said ring being engageable with a portion of said wheel to turn the ring; and means for supplying such wheel portion with lubricant whereby lubricant is transferred to the ring.

15. Lubricating mechanism including a pitman; a wheel connected with one end of the pitman for operating it; a ring loosely carried at the other end of the pitman and bodily moved thereby, said ring being engageable with a portion of said wheel to turn the ring; and means for supplying such wheel portion with lubricant whereby lubricant is transferred to the ring, the place of engagement of the wheel and ring being in a vertical line that is upon one side of the center of gravity of the ring, the end of the pitman remote from the wheel continuing in this movement after the ring engages the wheel whereby gravity also takes part in turning the ring.

16. Lubricating mechanism including a pitman; a wheel connected with one end of the pitman for operating it; a ring loosely carried at the other end of the pitman and bodily moved thereby, said ring being engageable with a portion of the wheel; and means for supplying such wheel portion with lubricant whereby lubricant is transferred to the ring, the splace of engagement of the wheel and ring being in a vertical line that is upon one side of the center of gravity of the ring, the end of the pitman remote from the wheel continuing in this movement after the ring engages the wheel whereby gravity is effective in turning the ring.

17. Lubricating mechanism including a reciprocating element; a lubricant conveyer loosely carried upon the reciprocating element; and means intermittently contacting with the lubricant conveyer for intermittently moving said lubricant conveyer with respect to the reciprocating element.

18. Lubricating mechanism including a bodily moving rotating lubricant conveyer; a source of lubricant with which such conveyer contacts; and means for engaging said conveyer upon one side of the vertical line including the center of gravity of the conveyer to arrest the bodily movement thereof to turn it.

In witness whereof I hereunto subscribe my name this 24th day of November, A. D. 1919.

DANIEL R. SCHOLES.